Patented Jan. 28, 1930

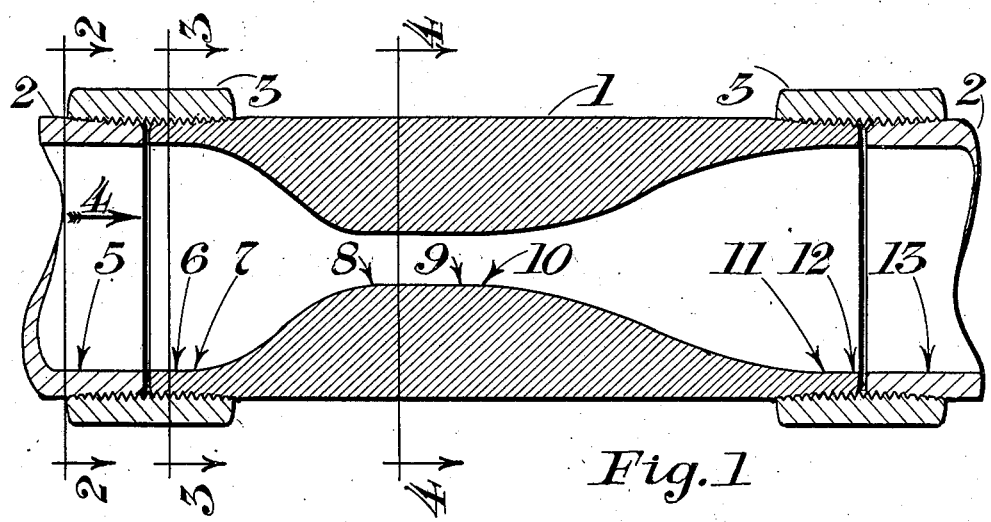
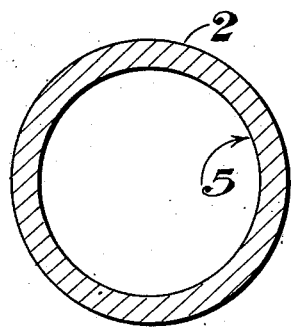
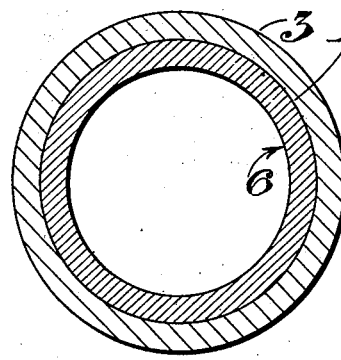
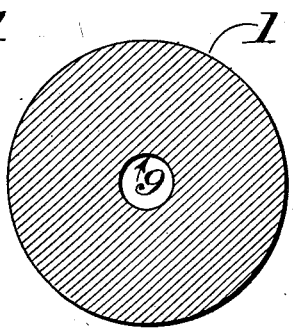
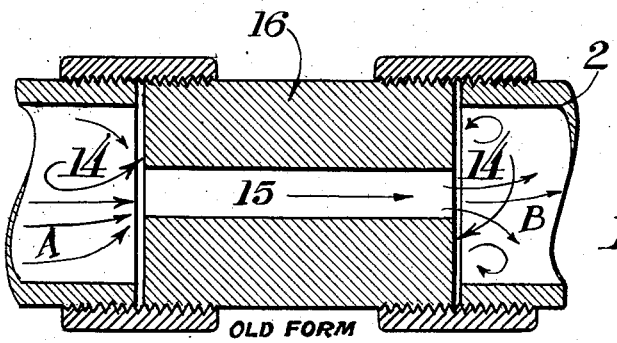
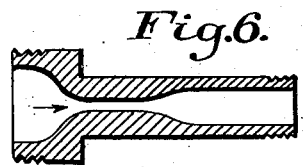

1,744,842

UNITED STATES PATENT OFFICE

LEW SUVERKROP AND DONALD JOSEPH WALLACE, OF TAFT, CALIFORNIA

FLOW NIPPLE

Application filed July 14, 1926. Serial No. 122,444.

Our invention relates to improvements in flow nipples and more particularly to flow nipples which are used in oil wells. When oil wells flow it is frequently desirable to regulate or reduce the flow of oil from the well and for this purpose it is customary to use a special appliance known as a flow nipple or "bean".

It is an object of this invention to provide an improved flow nipple which is highly efficient in service, simple in construction and easy to manufacture.

It is another object of this invention to provide a flow nipple which has curved or funnel-shaped mouth pieces preceding and following a minimum throat section.

It is another object of this invention to provide a flow nipple having at one or both ends mouthpieces of gradually varying cross-section so as to cause only gradual changes in the velocity of the fluid passing through the nipple.

It is also an object of this invention to provide a flow nipple which will reduce the flow without causing eddy currents to be set up and which will prevent the forming of an emulsion due to the stirring of oil and water when the well is producing water with the oil.

It is also an object of this invention to provide an improved process for preventing emulsion during the flow of oil from a well.

These and other objects of the present invention will appear from the following more detailed description of one embodiment thereof. The invention, however, is capable of receiving a variety of mechanical expressions, only one of which has been shown in the accompanying drawings, and it is to be expressly understood that the drawings are to be taken for purposes of illustration only, and are not to be constructed as a definition of the limits of the invention, reference being had to the appended claims for that purpose.

Referring in detail to said drawings wherein the same characters of reference are employed to designate corresponding parts in the several figures:

Fig. 1 is a longitudinal cross-sectional view through our improved flow nipple as placed in the flow line from the well, Figs. 2, 3 and 4 are transverse cross-sectional views taken respectively, on the lines 2—2, 3—3, and 4—4 of Fig. 1, Fig. 5 is a longitudinal cross-sectional view through an ordinary flow nipple or "bean", and Fig. 6 is a longitudinal cross-sectional view through a modified form of flow nipple, the preferred direction of flow being indicated by the arrow.

Our improved flow nipple or "bean" for reducing the flow of oil from a well is designated 1 and is shown (see Fig. 1) inserted in the pipe line 2 through which the fluid of the well discharges in the direction indicated by the arrow 4. The "bean" 1 is held in place by threaded collars 3 or by any other coupling means.

When it is desirable to regulate or reduce the flow of oil from a well it is not practicable to use an ordinary valve especially where the well is flowing under high pressure and "making sand" because the sand will "cut" the valve and render it useless. A special appliance is used for this purpose, known as a flow nipple or "bean". A bean of the ordinary type is shown at 16 in Fig. 5. It consists of a short length of pipe having a cylindrical hole 15 smaller than the inside diameter of the pipe line 2 from the well in which line the bean 16 is inserted in a manner similar to the insertion of flow nipple 1 in the pipe line 2 (Fig. 1). When an ordinary bean 16 is used the flow of oil from the well depends on the size of the hole 15 in the bean; and as can be seen from Fig. 5 a solid straight wall 14 is presented in the path of the fluid, which wall corresponds in size to the difference in diameter of the hole 15 and the pipe line 2. Due to the sudden reduction and increase in the stream, before and following the hole 15 in the bean 16, eddy currents are set up at A and B, in Fig. 5. When the well is producing water with the oil, eddy currents such as may be formed at these points will cause an emulsion to be formed. Formerly and now generally it is believed that the emulsion is formed within the well, due to the interference of perforations with the oil-water mixture. Experiment has demonstrated to us that emulsion forms at the bean and one of the objects of our improved flow nipple is to prevent the formation of this emulsion which is exceedingly undesirable.

Our bean 1 illustrated in Fig. 1 has mouth pieces 7 and 11 preceding and following the minimum throat section 9, these mouth pieces being curved in longitudinal section for the purpose of reducing or eliminating the effect of eddy currents which may here stir the mixture of oil and water into an emulsion.

5 indicates the inside diameter of the pipe or flow line 2 through which the fluid comes to the bean. The upstream end 6 of the bean 1 has substantially the same inside diameter as the diameter 5, and the diameter is approximately constant until the point 7 is reached where the inside walls of the bean cease to be of uniform diameter and gradually decrease in diameter to the point 8, where they are tangent to and merge into the minimum throat section 9. This portion 9 of the flow nipple is shown as having straight line walls to give the nipple the wearing qualities and flow reducing characteristics of an ordinary bean, and the length of this section may be long or short as may be found necessary under existing conditions. A long uniform minimum section prolongs the life of a bean but is not essential in a well not making sand with the oil, or where it is not desired to have the bean of a long and useful life. This straight minimum section may be omitted altogether, in which case the two funnel shaped mouthpieces will merge into and be tangent to each other at a single point. From the point 10 to point 11 the inside walls of the bean curve so as to gradually increase the diameter of the bean walls until point 11 is reached and at this point the walls become tangent to the cylindrical shaped exit portion 12 which is of substantially the same diameter as the inside diameter 13 of the exit pipe line 2. It will thus be seen that the walls of the passageway through our improved flow nipple take the form of a surface of revolution similar to that indicated in Fig. 1 as formed by the curve 6—7—8—9—10—11—12, revolved about the central axis of the bean. This curve gives curved funnel shaped entrance and discharge portions which are tangent to the straight walls of the portion 9 and the portions 6 and 12. It will be obvious that the cylindrical portions 6 and 12 may be omitted if desired, since they are in effect continuations of the pipe 2 and the ends 11 and 7 of the curved portions of the bean are really tangent to the inside straight walls of the pipe 2.

Our flow nipple is designed for the purpose of reducing flow in oil wells and more particularly for reducing flow without causing eddy currents and thereby eliminating the formation of an emulsion. It will be noticed in Fig. 1 that the walls of the funnel shaped entrance and exit passages are not straight in longitudinal section but are curved from point 7 to 8 and point 10 to 11. For the best results the curve must be a "smooth" curve, tangent to the pipe 2 at the beginning and end of the nipple and tangent to the throat 9. The curves as shown in Fig. 1 were calculated from a sine curve or cosine curve, where $y = \sin A$, or $y = \cosine A$. The sine curve is valuable because it is so simple but is merely chosen to give one example of the sort of curve desirable. Any smooth curve which would continually cause only gradual changes in velocity would do. We wish it to be expressly understood that our invention is not limited to the particular type of curve disclosed since anyone approximating the curve disclosed would also approximate the results obtained by our preferred embodiment.

A gradually expanding discharge end 10—11 is desirable due to the fact that on this side the pressure being reduced or released the gas is permitted to come out of solution and sometimes causes trouble. At this point the bean must be even more exacting in leading the fluid in the desired path. The flow following the bean is reduced by the increase in area—that is, the velocity is reduced.

It will also be noted in Fig. 1 that the blunt or more obtuse end is that end at which the fluid enters the bean, i. e. the up-stream end. However, it is important to mention here that it is not necessary to have different mouth shapes up- and down-stream. The upstream end may be more gradual than the down-stream end or both ends may have the same curvature.

Furthermore it would be possible to omit the funnel shape at one end of the bean and get results which would be an excuse for what we get. In that case the end of the bean which was not funnel shaped could be shaped like the ends of an ordinary bean 16. While the inside diameters of the pipe 2 at points 5 and 13 have been shown as substantially equal, it will often be found desirable to have the diameter at point 13 greater or less than the diameter at point 5, see Fig. 6, and to shape the exit passage 10, 11, 12 to correspond, so that the fluid will be gradually led into the pipe 2 at point 13. For example, we have constructed one bean, according to this invention, which was 25 inches long overall and which flowed 1500 barrels of fluid per day from a 3 inch pipe into a 2 inch pipe. Various other changes may also be made in details of construction, arrangement and proportion of parts without departing from the spirit of the present invention.

The improved bean may be made in any suitable manner. It is preferable that it be made of solid, "one piece" metal. This can be done by accurately turning on a lathe two bottle shaped steel cores, one corresponding in shape to the entrance half of the passageway 6—9 and the other corresponding in shape to the exit half of the passageway 9—12. These two cores are joined together at their neck ends and held centrally within a short length of pipe. Lead, Babbitt metal or other suitable metal is then poured into a large hole in the side of the pipe and flows completely around the cores. When the poured metal hardens, the cores are withdrawn leaving a passageway of the desired shape through the bean.

From the foregoing description it will be apparent that our bean possesses many advantages over the ordinary bean. The shock which causes the emulsion in the ordinary bean is absent. The fluid does not bang up against a solid wall placed in its path through which there is but a small hole for escape, but the mixture of oil and water is gradually led to and through the minimum section. The sudden squeezing together of oil and water is absent, since it takes some time for the fluid passing through our bean to pass from the maximum section to the throat, and from the throat to the maximum section again.

While the embodiment of our invention illustrated in the drawings has been described with considerable particularity, it is to be expressly understood that the invention is not to be restricted thereto, reference being had to the appended claims for a definition of the limits of the invention.

We claim:

1. An oil well flow nipple comprising a solid piece of metal having means at both ends for detachably connecting it in the pipe line from an oil well and having an unobstructed conduit therethrough, said conduit comprising a restricted throat portion and a substantially funnel shaped mouth piece preceding in the direction of flow said throat portion, the walls of said mouth piece being curved in longitudinal cross section, said curve being a part of a sine curve tangent at one end to said throat portion and tangent at its other end to a line parallel with the axis of the flow nipple, and the large end of said mouth piece being of a diameter substantially equal to that of said pipe line to constitute a passage free from abrupt wall surfaces.

2. An oil well flow nipple adapted to regulate the flow of fluid from a well, said nipple having a conduit therethrough, said conduit having an elongated restricted throat portion, means preceding said throat portion for gradually increasing the velocity of fluid from a well and means following said throat portion for gradually reducing the velocity of said fluid.

3. The process of reducing the flow of fluid from an oil well without causing an emulsion to be formed which consists in gradually reducing the transverse cross-sectional area of the flowing oil-water mixture until a predetermined minimum restricted cross-sectional area is reached maintaining said minimum cross-sectional area for a predetermined distance of flow and then gradually increasing the transverse cross-section area of the oil-water mixture as it continues to flow whereby the pressure exerted on the oil-water mixture by said restricted area is gradually released.

4. An oil well flow nipple comprising a member formed of solid metal, the ends of said member being formed for detachable connection to an oil well pipe line, said member having a conduit therethrough, said conduit comprising a straight walled restricted throat portion and substantially funnel throat portion and substantially funnel shaped mouth pieces preceding and following said throat portion, said mouth pieces merging into said throat portion at their small ends, the walls of said mouth pieces being curved in longitudinal cross section said curve being a part of a sine curve tangent at one end to said throat portion and terminating at its other end near and substantially parallel to the end outside wall of the nipple whereby the large ends of the mouth pieces will merge into the inside walls of said oil well pipe line.

5. A flow nipple according to claim 4 in which the mouth piece at one end is more blunt than the mouth piece at the other end and in which the larger end of one mouth piece is of greater diameter than the larger end of the other mouth piece.

6. An oil well flow nipple adapted to be inserted in the pipe line of an oil well having means at both ends for detachably connecting it in the pipe line, said nipple having a smooth walled conduit therethrough, said conduit comprising a straight walled restricted throat portion and a substantially funnel shaped mouthpiece at one end of said throat portion, the walls of said mouth piece being curved in longitudinal cross section, said curve being part of a sine curve tangent at one end to said throat portion and terminating at its other end near and substantially parallel to the end outside wall of the nipple whereby the large end of said mouth piece will merge into the inside walls of said pipe line so that said mouth piece and the pipe line will constitute a flow passage free from abrupt wall surfaces.

7. An oil well flow nipple adapted to be inserted in the pipe line of an oil well having means at both ends for detachably connecting it in the pipe line, said nipple having a smooth walled conduit therethrough, said conduit comprising a straight walled restricted throat portion and a substantially funnel shaped mouth piece following said throat portion in the direction of flow, the walls of said mouth piece being curved in longitudinal cross section, said mouth piece merging into said throat portion at one end and at its larger end being of a diameter substantially equal to that of said pipe line so that said mouth piece and pipe line when assembled for use will constitute an exit flow passage free from abrupt wall surfaces disturbing the smooth flow.

8. An oil well flow nipple adapted to be inserted in the pipe line of an oil well, said nipple having a smooth walled conduit therethrough said conduit comprising a straight walled restricted throat portion and substantially funnel shaped mouth pieces, one preceding and one following said throat portion, in the direction of flow, the walls of said mouth pieces being curved in longitudinal cross section, said curve merging at one end smoothly into said throat portion and terminating at its other end near and substantially parallel to the end outside wall of the nipple so that the large ends of said mouth pieces and the ends of the pipe line will constitute a flow passage free from abrupt wall surfaces facing or following the flow.

9. An oil well flow nipple adapted to be inserted in the pipe line of an oil well, said nipple comprising a solid piece of metal having a smooth walled conduit therethrough, said conduit comprising a straight walled, elongated, restricted throat portion and a substantially funnel shaped mouth piece at each end of said throat portion the walls of said mouth pieces being curved in longitudinal cross section, said curve being a smooth curve merging into the throat portion at one end and terminating at its other end near the outside wall of the nipple and substantially parallel to the axis of the nipple whereby the large ends of said mouth pieces in connection with the flow orifices of said pipe line will constitute a flow passage free from abrupt wall surfaces facing or following the flow.

10. A flow nipple according to claim 9 in which the mouth piece at one end is more blunt than the mouth piece at the other end.

11. A flow nipple according to claim 9 in which the diameter of the large end of one mouth piece is less than the diameter of the large end of the other mouth piece.

12. A flow nipple according to claim 9 in which the diameter of the large end of the mouth piece which follows the throat portion in the direction of flow is smaller than the diameter of the large end of the other mouth piece.

LEW SUVERKROP.
DONALD JOSEPH WALLACE.